United States Patent [19]

Wentworth, Jr., deceased et al.

[11] Patent Number: 4,744,569
[45] Date of Patent: May 17, 1988

[54] BELLOWS MECHANICAL SEAL WITH INACTIVE DIAPHRAGMS

[75] Inventors: Robert S. Wentworth, Jr., deceased, late of Murrieta, Calif.; by Benning Wentworth, executor, St. Charles, Ill.

[73] Assignee: BW/IP International, Inc., Long Beach, Calif.

[21] Appl. No.: 107,334

[22] Filed: Oct. 13, 1987

[51] Int. Cl.⁴ .............................................. F16J 15/36
[52] U.S. Cl. .................................. 277/88; 277/93 SD
[58] Field of Search ............... 277/38, 42, 43, 81 R, 277/88, 89, 93 R, 93 SD, 200

[56] References Cited

U.S. PATENT DOCUMENTS

| | | | |
|---|---|---|---|
| 1,822,052 | 9/1931 | Maccabee | 277/88 |
| 3,277,927 | 10/1966 | Schneider | 277/88 X |
| 3,550,989 | 12/1970 | Hall et al. | 277/88 X |
| 3,776,560 | 12/1973 | Wentworth | 277/93 X |

*Primary Examiner*—Robert S. Ward
*Attorney, Agent, or Firm*—Aubrey L. Burgess

[57] ABSTRACT

A bellows type mechanical seal assembly in which the bellows is provided with inactive or non-functional diaphragms to increase the pressure capacity of the seal assembly.

5 Claims, 2 Drawing Sheets

BELLOWS MECHANICAL SEAL WITH INACTIVE DIAPHRAGMS

FIELD OF THE INVENTION

This invention relates to bellows type mechanical seal assemblies. In such seal assemblies used to substantially prevent a relatively high pressure fluid, as for example, fluid from a pump from flowing along the pump shaft to the motor driving the pump. Such seal assemblies comprise a pair of seal rings with opposing faces and a metal bellows surrounding the shaft. The bellows is connected at one end to one of said seal rings, generally the rotatable seal ring, and at the other end to a cylindrical member which is generally connected to the shaft. The bellows not only separates a high pressure chamber from a lower pressure area but also resiliently urges the seal ring to which it is connected toward the opposing seal ring.

DISCUSSION OF THE PRIOR ART

Bellows seals are well known in the art. Some examples are shown in U.S. Pat. Nos. 3,372,939; 3,776,560; 4,163,563; 4,365,816 and 4,453,722. Each of these patents illustrates a metal bellows constructed of a plurality of stacked annular members or diaphragms welded together with their free ends connected to structure of the seal assembly.

The U.S. Pat. No. 1,727,281, to Fulton, shows metal bellows constructed of tubular metal with reinforced end flanges. The end flanges are reinforced by extra end sections folded back against the next adjacent section. The bellows is used in a valve structure.

BRIEF DESCRIPTION OF THE INVENTION

As before stated, this invention relates to bellows type mechanical seals and one of its unique features is the bellows arrangement with respect to those parts of the seal assembly to which the bellows is connected.

If the structure of U.S. Pat. No. 3,776,560 is considered, it will be observed that the bellows is constructed of a plurality of stacked annular members or diaphragms, the next adjacent ones of which are welded together at their inner and outer extremities, a conventional method for manufacturing bellows. It will also be observed that one free end or extremity of the generally cylindrical bellows is connected to a bellows support member which in turn is connected to the shaft while the other free end of the bellows is connected to a ferrule surrounding and supporting the rotatable seal ring.

According to this invention to be described herein, there is provided al least one "inactive diaphragm" at an end of the bellows, and generally an inactive or non-functional diaphragm is provided at both ends of the bellows. The inactive diaphragms have one extremity, usually the inner extremity, free of a joint, a joint being the weld joining diaphragms together.

By following the teachings of this invention, the end convolutions of the bellows receive mechanical support similar to that received by the other convolutions of the bellows, and the pressure resisting capacity of the metal bellows is increased when compared to the bellows as taught by the prior art.

At high pressures, in the absence of this invention, the pressure capacity of nested ripple metal bellows is increased if the bellows is operated at relatively close pitch, so that the diaphragms can rest against each other, limiting the unsupported part of the bellows. Common practice is to simply provide clearances for the ripples of the outermost diaphragms. These diaphragms are then subject to higher stress than the remainder of the bellows. By minimizing this clearance and providing the non-functional or inactive diaphragms at each end of the bellows, as taught herein, the unsupported area is minimized and the pressure capacity of the seal is enhanced.

DETAILED DESCRIPTION OF THE PREFERRED EMBODIMENTS

Figure 1:
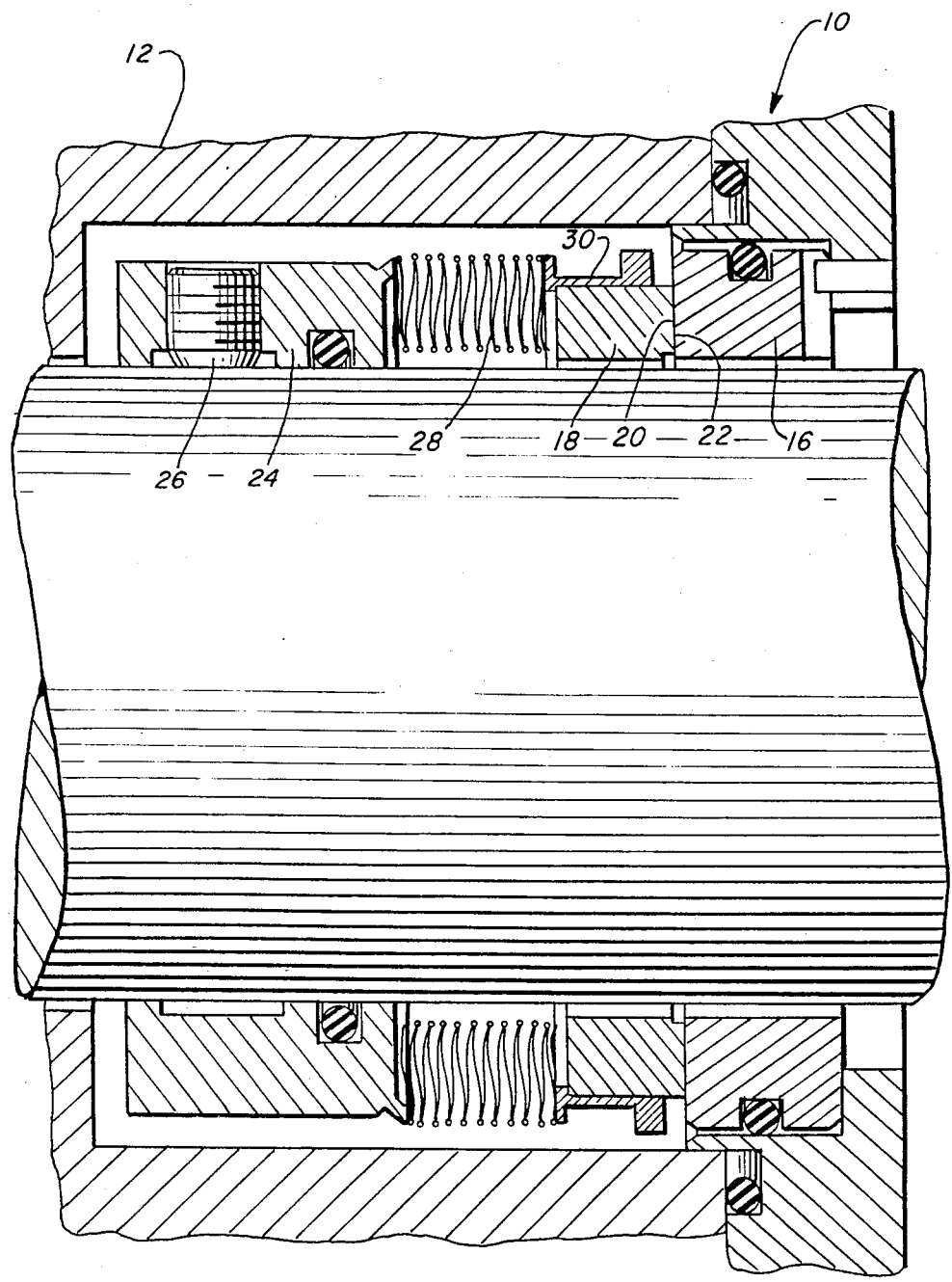
FIG. 1 is an axial sectional view of a mechanical seal assembly constructed according to this invention.

Looking now at the drawings, there is illustrated a mechanical seal assembly 10 positioned within a housing 12 and surrounding a shaft 14 passing through the housing. The seal assembly 10 comprises a non-rotatable seal ring 16 and a rotatable seal ring 18, the seal rings having lapped and opposing seal faces 20 and 22. The seal ring 18 is rotatably connected to the shaft 14 for rotation therewith by a metal cylindrical support member 24, connected to the shaft 14 by one or more set screws 26, and a bellows 28 connected at one end to the support member 24 and at the other end to a metal ferrule 30 surrounding and supporting the seal ring 18, the ferrule 30 being shrink fitted around the seal ring 18. The bellows 28, as in the conventional bellows seal, resiliently urges the seal ring 18 toward the seal ring 16.

Figure 2:
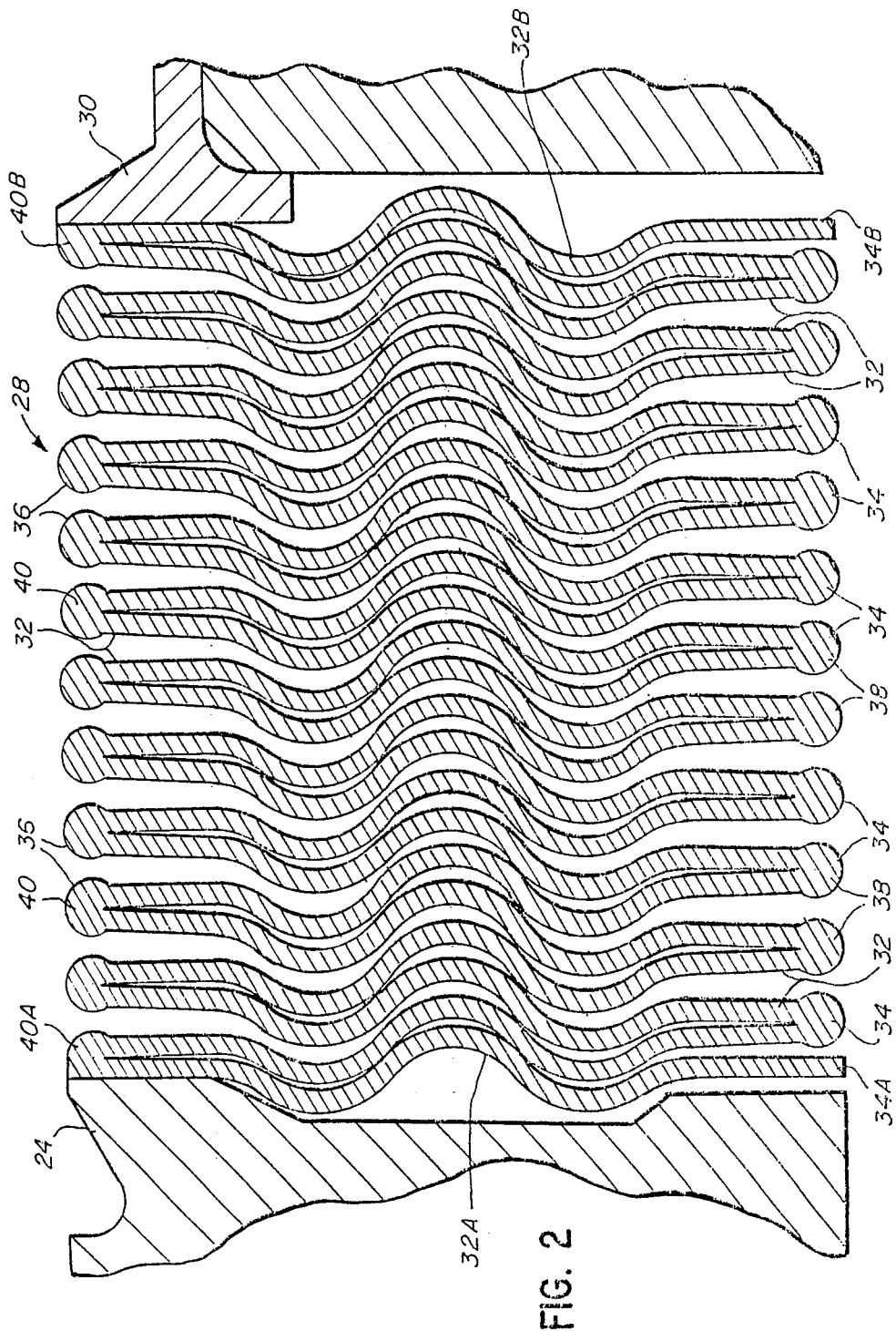
FIG. 2 is a partial axial sectional and enlarged view of the bellows illustrated in FIG. 1.

FIG. 2 illustrates details of the bellows 28 which comprises a plurality of stacked, rippled metal annular diaphragms 32 joined at their inner and outer extremities 34 and 36 by welding to form a series of inner and outer joints 38 and 40. The end diaphragms 32A, 32B have their inner extremities 34A free of a joint while the end joints 40A, 40B are connected, as by welding, to the support member 24 at one end and the ferrule 30 at the other end. Thus the end diaphragms 32A, 32B are inactive or non-functional in the bellows construction.

The structure just described provides support for the closely adjacent diaphragms of the bellows, thus increasing the pressure capacity of the bellows. With this arrangement, all functioning diaphragms (those except diaphragms 32A and 32B) of the bellows receive substantially equal mechanical support.

While the rotating seal ring described above is connected directly to the shaft, it is to be understood that the rotating seal ring structure can be assembled onto a cylindrical sleeve to be received on and connected by suitable means to a rotatable shaft without departing from the spirit of the invention.

The appended claims are intended to cover all reasonable equivalents and are to be interpreted as broadly as the prior art will permit.

I claim:

1. In a bellows type mechanical seal assembly adapted to surround a rotatable shaft and having a non-rotatable seal ring and a rotatable seal ring, means connecting said rotatable seal ring to said shaft, the seal rings having lapped seal faces opposing one another so as to be relatively rotating when the shaft rotates, and resilient means comprising a metal bellows for urging at least one of said seal rings axially toward the other seal ring, said bellows being constructed of a plurality of annular diaphragms in stacked relationship with the next adjacent ones connected at their outer and inner extremities forming a series of outer and inner joints and with an extremity of the outermost diaphragms free of a joint, the improvement comprising:

said bellows having a connection at one end to said connecting means and at the other end to said rotatable seal ring, the connection of one end of said bellows being at a joint so as to provide at least one inactive diaphragm adjacent an end thereof.

2. In a bellows type mechanical seal assembly as recited in claim 1, where said diaphragms are wavy annular members.

3. In a bellows type mechanical seal assembly as recited in claim 1, where the connection at the other end of said bellows is at a joint so as to provide an inactive diaphragm at both ends of said bellows, one inactive diaphragm adjacent said connecting means and the other adjacent said rotatable seal ring.

4. In a bellows type mechanical seal assembly as recited in claim 3, where said bellows is welded to said connecting means and to means connected to said rotatable seal ring.

5. In a bellows type mechanical seal assembly as recited in claim 3, further comprising a cylindrical ferrule surrounding and joined to said rotatable seal ring, said bellows being connected at one end to said ferrule.

* * * * *